US011498481B2

(12) United States Patent
Osterfeld

(10) Patent No.: US 11,498,481 B2
(45) Date of Patent: Nov. 15, 2022

(54) MINIMUM TRAVEL HORN SYSTEM

(71) Applicant: Joyson Safety Systems Acquisition LLC, Auburn Hills, MI (US)

(72) Inventor: Doug Osterfeld, Waterford, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 0 days.

(21) Appl. No.: 16/839,760

(22) Filed: Apr. 3, 2020

(65) Prior Publication Data

US 2020/0317123 A1 Oct. 8, 2020

Related U.S. Application Data

(60) Provisional application No. 62/828,878, filed on Apr. 3, 2019.

(51) Int. Cl.
*B60Q 5/00* (2006.01)
*B60R 16/027* (2006.01)
*B60R 21/203* (2006.01)

(52) U.S. Cl.
CPC ............ *B60Q 5/003* (2013.01); *B60R 16/027* (2013.01); *B60R 21/203* (2013.01)

(58) Field of Classification Search
CPC ...... B60R 21/2037; B62D 7/222; B60Q 5/003
USPC ....................................................... 340/425.5
See application file for complete search history.

(56) References Cited

U.S. PATENT DOCUMENTS

| 5,965,952 A | 10/1999 | Podoloff et al. |
| 6,193,267 B1 | 2/2001 | Tichvon et al. |
| 7,464,959 B2 | 12/2008 | Pillsbury, IV et al. |
| 8,556,292 B2 | 10/2013 | Umemura et al. |
| 8,581,126 B1 | 11/2013 | Cannella |

(Continued)

FOREIGN PATENT DOCUMENTS

| CN | 103029741 A | 4/2013 |
| CN | 103338978 A | 10/2013 |

(Continued)

OTHER PUBLICATIONS

Office Action issued in CN Application No. 201680077940.8; dated Jan. 25, 2021; 32 pages.

(Continued)

*Primary Examiner* — Fabricio R Murillo Garcia
(74) *Attorney, Agent, or Firm* — Meunier Carlin & Curfman LLC

(57) ABSTRACT

A steering assembly and a system for actuating a vehicle horn uses a grounding signal transmitted from the steering assembly to an electronic control unit in communication with an electronically actuated horn. The steering assembly includes a base plate connected to a hub in the steering assembly. At least one horn grounding switch is coupled to the base plate and has a ground contact generating an output from the horn grounding switch. The ground contact is movable between a normally closed position connected to the vehicle electrical ground that corresponds to the off status of the vehicle horn and an open position disconnected from the vehicle electrical ground that corresponds to the on status of the vehicle horn. A biasing force directs the ground contact to a normally closed position in electrical communication with the vehicle electrical ground.

18 Claims, 9 Drawing Sheets

(56) References Cited

U.S. PATENT DOCUMENTS

| | | |
|---|---|---|
| 8,794,662 B2 | 8/2014 | Ishii et al. |
| 9,156,400 B2 | 10/2015 | Ishii et al. |
| 9,550,525 B2 | 1/2017 | Ishii et al. |
| 2007/0132218 A1 | 6/2007 | Kim et al. |
| 2009/0261560 A1 | 10/2009 | Nakagawa et al. |
| 2013/0015645 A1 | 1/2013 | Ullrey et al. |
| 2015/0042079 A1* | 2/2015 | Ishii .................. B60R 21/21658 280/728.2 |
| 2017/0072985 A1* | 3/2017 | Ishii .................... B60R 21/2037 |
| 2017/0158126 A1* | 6/2017 | Lisseman .......... B60R 21/21658 |
| 2017/0178846 A1 | 6/2017 | Raikar et al. |
| 2018/0029556 A1 | 2/2018 | Ishii et al. |
| 2019/0161004 A1* | 5/2019 | Park ....................... H01H 13/14 |
| 2019/0389374 A1* | 12/2019 | Thompson ............... B62D 1/06 |
| 2020/0043679 A1* | 2/2020 | Nonoyama ......... B60R 21/2037 |

FOREIGN PATENT DOCUMENTS

| | | |
|---|---|---|
| CN | 103366999 A | 10/2013 |
| CN | 111132874 A | 5/2020 |
| EP | 1348595 A2 | 10/2003 |
| JP | H061196 A | 1/1994 |
| JP | H10203375 A | 8/1998 |
| KR | 970037891 A | 7/1997 |
| KR | 20080093632 A | 10/2008 |
| WO | 2018166974 A1 | 9/2018 |
| WO | 2019063371 A1 | 4/2019 |

OTHER PUBLICATIONS

Non-Final Office Action in connection to U.S. Appl. No. 16/910,828, dated Mar. 30, 2022, 35 pages.

Chinese office action in Application No. 201680077940.8. dated Sep. 7, 2021. 7 pages.

\* cited by examiner

MINIMUM TRAVEL HORN SYSTEM

CROSS REFERENCE TO RELATED APPLICATION

This application claims priority to United States Provisional Patent Application Ser. No. 62/828,878 which is incorporated by reference as if set forth in its entirety herein.

FIELD OF THE DISCLOSURE

This disclosure relates to circuits for horn operation in a vehicle with a grounding circuit that reduces gaps in the physical construction of a steering wheel assembly.

BACKGROUND

Horn switches may be integrated into a driver air bag module within a vehicle. For example, the driver air bag module may be secured onto a frame of a hub of a steering wheel in the vehicle. In earlier versions of horn circuits, the driver air bag module have connected to or supported an electrical contact that completes an electrical circuit of a horn system when the air bag module is moved toward a corresponding electrical contact on the steering wheel frame. Typically, the contact on the driver air bag module is biased away from the contact on the steering wheel frame using springs, and the vehicle operator must push the driver air bag module with sufficient force to overcome the biasing force of the springs and close the horn circuit. The horn signal that is produced by completing the circuit is an on/off signal that, in some embodiments, is directed to a vehicle accessory control circuit to actuate a horn on the vehicle to create an audible alert sound. In addition, depending on the location and number of the contacts, the force required to actuate the horn in the center of the driver air bag module may be higher than the force required to actuate the horn from the periphery of the driver air bag module. Furthermore, the horn may be actuated inadvertently if the vehicle is subjected to vibration, such as off-road conditions.

In some implementations in which the edges of an air bag cover are spaced apart from a steering wheel hub after installation, a gap is present between the air bag cover and the steering wheel hub. The gap is often considered aesthetically undesirable and allows for dust and other contaminants to gather within the gap.

Thus, there is a need in the art for an improved horn system that minimizes the gap and still provides reliable control circuitry for operating a horn system.

BRIEF SUMMARY

Various implementations are directed to an improved horn system for use in a vehicle.

The details of one or more implementations of the invention are set forth in the accompanying drawings and the description below. Other features, objects, and advantages of the invention will be apparent from the description and drawings, and from the claims.

A steering assembly and a system for actuating a vehicle horn use a grounding signal transmitted from the steering assembly to an electronic control unit in communication with an electronically actuated horn. The steering assembly includes a base plate connected to a hub in the steering assembly. At least one horn grounding switch is coupled to the base plate and has a ground contact generating an output from the horn grounding switch. The ground contact is movable between a normally closed position connected to the vehicle electrical ground, that corresponds to the off status of the vehicle horn, and an open position, disconnected from the vehicle electrical ground, that corresponds to the on status of the vehicle horn. A biasing force directs the ground contact to a normally closed position in electrical communication with the vehicle electrical ground.

In another embodiment, a steering assembly includes a base plate connected to a hub of a steering assembly. At least one horn grounding switch is coupled to the base plate and generates an output to toggle a vehicle horn between an off status and an on status. A respective ground contact is positioned within the at least one horn grounding switch, and the ground contact generates the output from the horn grounding switch according to a selectable position relative to a vehicle electrical ground. The ground contact is movable from a normally closed position connected to the vehicle ground, that corresponds to the off status of the vehicle horn, and an open position disconnected from the vehicle ground that corresponds to the on status of the vehicle horn.

In some embodiments, the steering assembly further includes an air bag module coupled to the base plate. A bolt, made of a conductive material in electrical communication with the vehicle electrical ground is also coupled to the steering assembly, wherein a respective ground contact is in an electrical connection with the bolt in the normally closed position. A dampener is coupled to the base plate and the ground contact, and a sleeve is coupled to the dampener to engage a spring positioned between the sleeve and the steering assembly. The spring biases the ground contact to be in a position forming an electrical connection with the bolt connected to the vehicle electrical ground. For selectable forces that are applied to the base plate and that are greater than a biasing force from the spring, the ground contact moves away from the bolt to the open position. An ECU senses the open position of the horn grounding switch and activates a corresponding horn system in the vehicle.

BRIEF DESCRIPTION OF THE DRAWINGS

Various implementations of the system are explained in even greater detail in the following exemplary drawings. The drawings are merely exemplary to illustrate the structure of the system and certain features that may be used singularly or in combination with other features. The invention should not be limited to the implementations shown.

DETAILED DESCRIPTION

Figure 1:
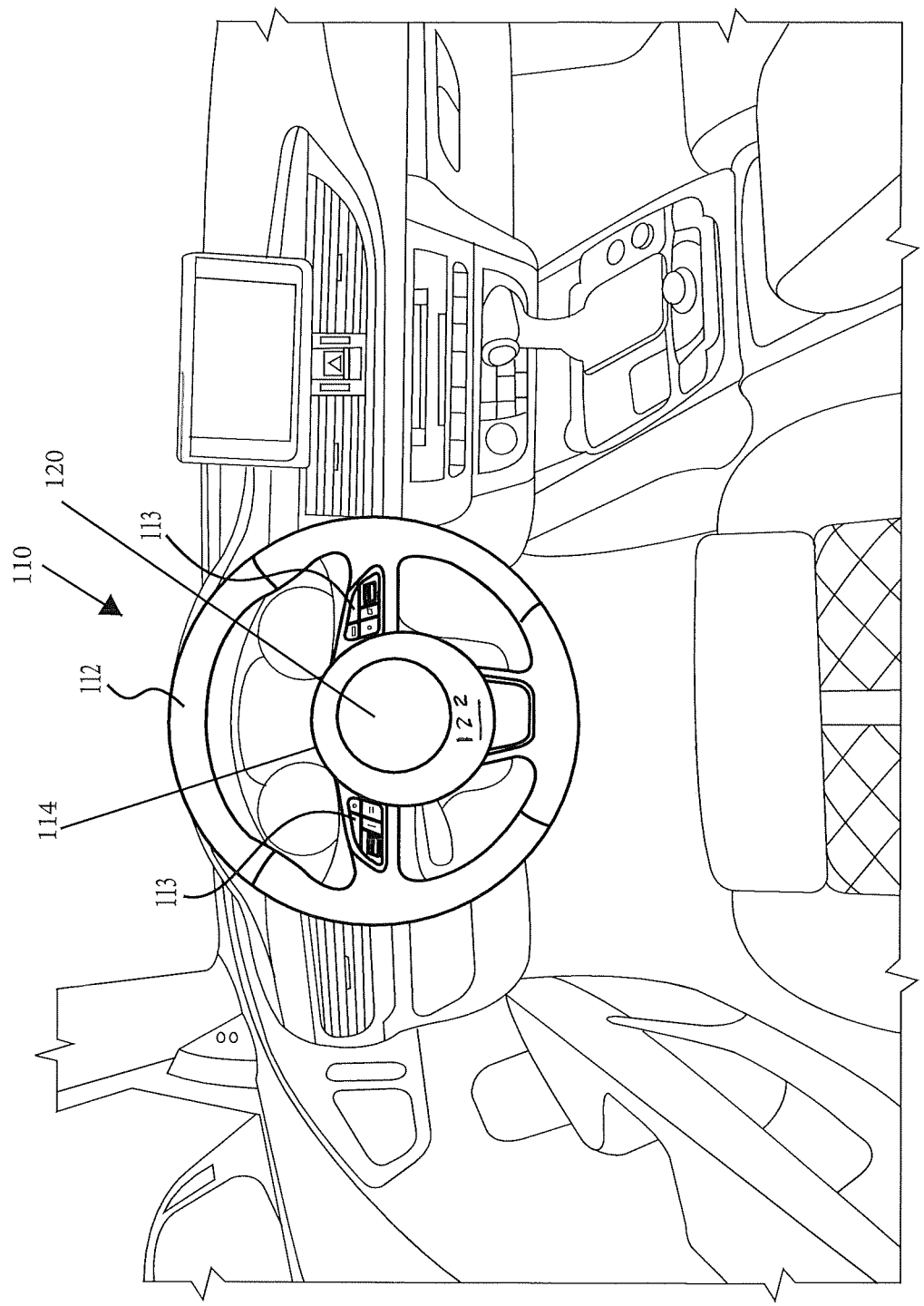
FIG. 1 is a perspective view of a PRIOR ART steering assembly used as an example environment for this disclosure.

Various implementations are directed to an improved horn system for use in a vehicle. The horn system includes one or more horn grounding switches coupled to at least a portion of a driver air bag module. For example, the horn grounding switches may be disposed adjacent or around a perimeter of a base plate of a driver air bag module, such as peripheral to a driver air bag and inflator disposed within a central portion of the base plate. To actuate the horn, the air bag cover is moved axially toward the base plate which is attached to the air bag module in a configuration that allows a user to transmit a selectable force to the base plate and move a ground contact within the horn grounding switch. A "selectable force" as discussed in this disclosure includes, but is not limited to, a manual force from a user or vehicle driver that is selectable in terms of position relative to an air bag module or air bag cover and is furthermore selectable in terms of the magnitude and/or duration of the application of the force. A selectable force may also include forces on intermediate structures connected between a user and the air bag module. For ease of reference, this disclosure may refer to forces and components from the perspective of a driver of a vehicle using the steering assembly and the vehicle horn system, such that a proximate portion of a steering assembly and/or air bag module is closer to the driver than a distal portion of the same steering system and/or air bag module. Similarly, axes and axial movement as described herein imply a direction that is parallel to a long axis, or longitudinal axis 119, of a steering column 117 (i.e., directions back and forth on a line from the driver's body toward a center of an air bag module and base plate structures). These descriptive terms are not limiting of the concepts disclosed herein but are used for convenience in illustrating the concepts herein.

Furthermore, embodiments of this disclosure include the use of electronic control units that utilize computer programs to vary horn profiles that may be based on a magnitude and/or duration of at least one force signal applied to a steering assembly by a vehicle user or driver. The embodiments utilize a variable number of horn circuits, and spatial arrangements of the respective horn circuits, particularly the grounding circuits described below, may be positioned in multiple arrangements with respect to a driver air bag module. Embodiments of this disclosure may be enhanced with tactile and/or audible feedback profiles corresponding to magnitudes, locations, and/or durations of a user's selectable forces applied to actuate a horn system in the vehicle.

Certain implementations of the horn system described below utilize an air bag module cover and an internal base plate of a steering wheel assembly for transmitting axially directed selectable forces to actuate the horn system. In some embodiments, the steering assembly of a vehicle provides for a lower spring to bias components of the system described below to allow for toggling a horn with an on or off signal from a horn grounding switch. In addition, in some implementations, the horn system requires less displacement to actuate the horn system as compared with current systems. This feature may allow an air bag cover to be disposed closer to the base plate coupled to the driver air bag module and reduce and/or eliminate the visible gap between the steering interface (e.g., steering wheel) and the cover of the driver air bag module.

As background, prior art FIG. 1 illustrates a plan view of an exemplary steering interface implementing a horn system with a driver air bag module. An overall steering assembly 110 includes a steering grip 112, spokes 113, and a hub 114. The steering grip 112 can be shaped in such a way to facilitate a driver's control of a vehicle when holding the steering grip 112. For example, the steering grip 112 shown in FIG. 1 has a substantially annular ring shape with an outer contour that is essentially circular in shape. However, in other implementations, the steering grip can define any suitable shape including, for example, circular, elliptical, square, rectangular, a U shape, a V shape or any other regular or irregular shape. Furthermore, in other implementations, the steering grip can include a single continuous grip portion or any number of unique grip sections.

The steering grip 112 can be coupled to the hub 114 via spokes 113, and the hub 114 can be mounted on a fixed component of the vehicle such that the steering grip 112, spokes 113, and hub 114 can be rotationally moved about a steering axis. An exemplary fixed component can include, for example, a steering column 117, which receives a steering spindle that extends along the steering column and serves to transmit rotational movement of the steering grip 112 to the wheels of the motor vehicle. Rotational movement of the steering grip 112 may be transmitted to the wheels by mechanical and/or electrical means.

A driver air bag module 120 is operably coupled to the steering hub 114. An exemplary implementation of the driver air bag module 120 is shown in commonly owned patent application Ser. No. 15/368,101, published as U.S. Pat. App. Pub. No 2017/0158126, which is incorporated by reference herein as if set forth fully in this disclosure. As shown in that prior application, the driver air bag module 120 attaches to a base plate 124 and a cover 122. The base plate 124 is configured for being coupled to the hub 114 and the air bag module 120 with a planned range of motion that is typically parallel to a longitudinal axis 119 of the steering column 117. The range of motion of the base plate, as discussed below, allows a selectable force applied to the air bag module cover to be transmitted to a horn ground switch 180A, 180B, 180C as set forth herein. A driver air bag and inflator may be disposed adjacent an open central area 157 defined by outer side sections 153A, 153B of the base plate 124.

Figure 2A:
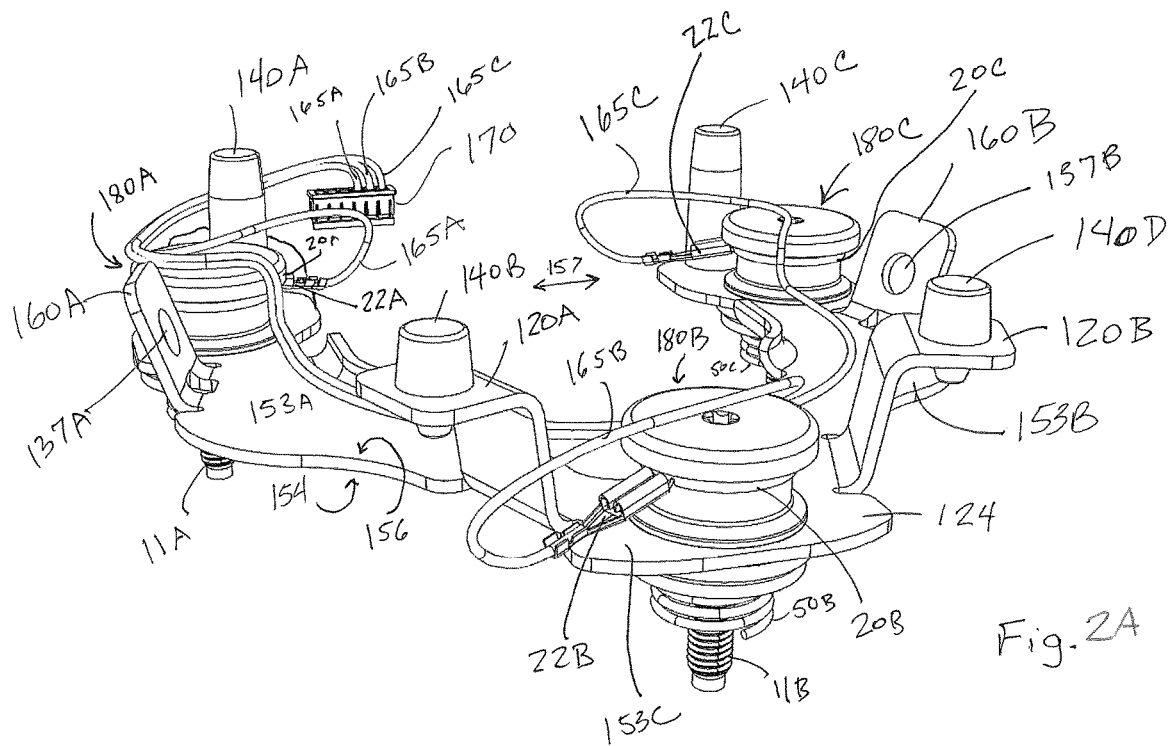
FIG. 2A is a perspective view of a base plate and associated horn grounding switches according to one implementation of this disclosure.
Figure 2B:
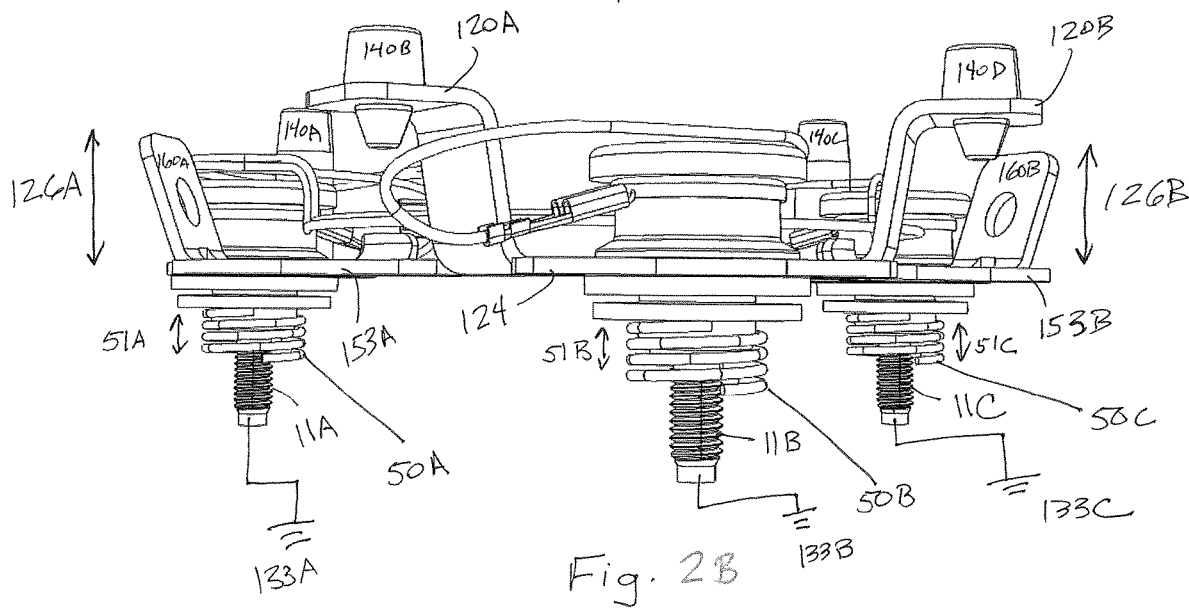
FIG. 2B is a side elevation view of a base plate and associated horn grounding switches according to one implementation of this disclosure.
Figure 3:
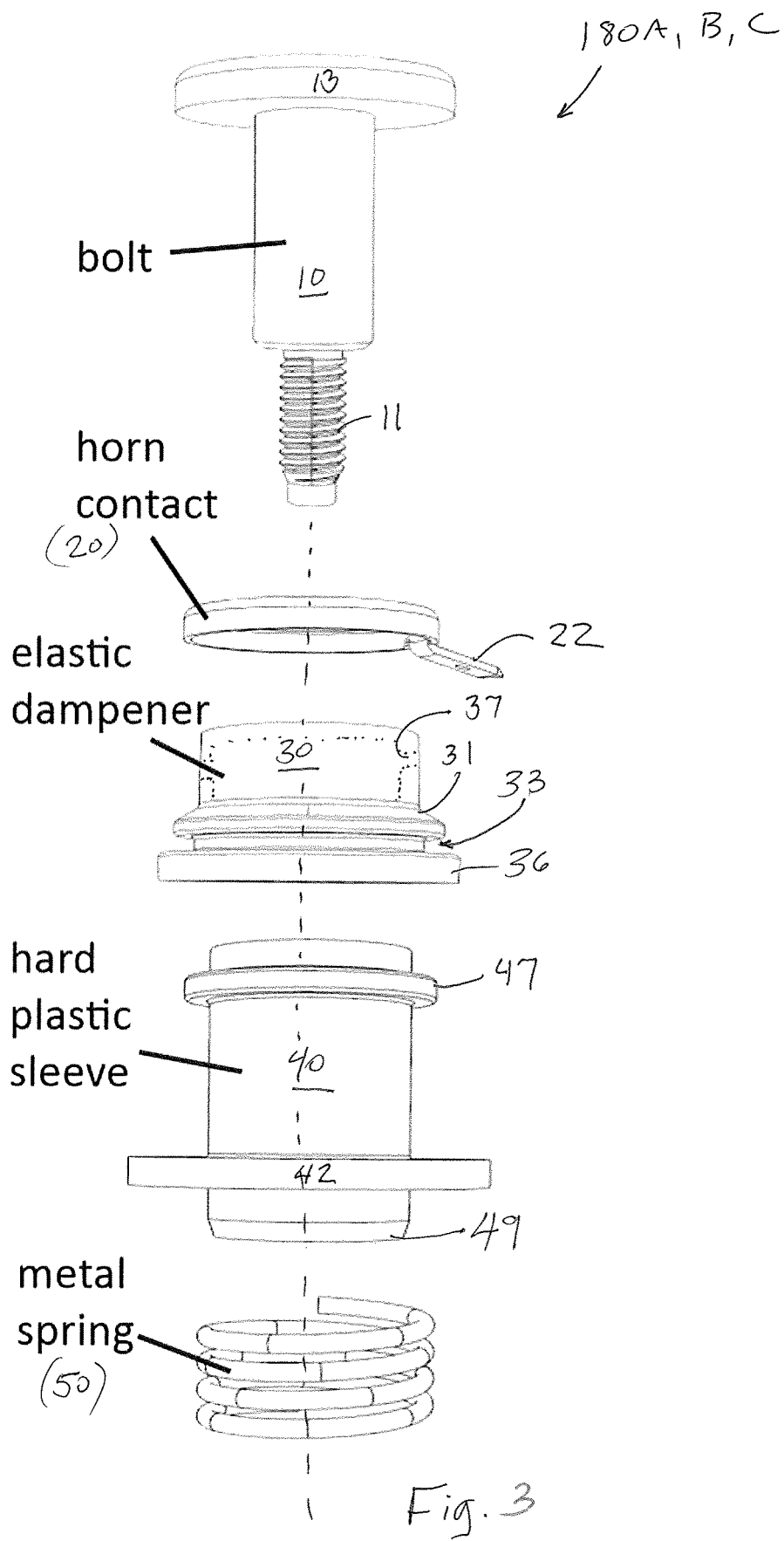
FIG. 3 is an exploded view of a horn grounding switch and associated components of a system for controlling a vehicle horn as disclosed herein.

For the example implementation shown in FIGS. 2 through 7, the base plate 124 is commonly coupled to the hub 114 by a bolt 10 shown, for example, in FIG. 3 with a threading 11 (shown in duplicate as 11A, 11B, 11C) that mates with a threading in the steering assembly component such as the hub 114. In other implementations, other suitable fastening mechanisms may be used to couple a driver air bag module 120 and a base plate 124 to the hub 114 and still be within the scope of this disclosure. A proximate surface 156 of the base plate 124 may be suitable for supporting portions of a horn grounding switch 180A, 180B, 180C and may be contoured to accommodate requirements for an overall steering assembly. In the example embodiments of FIGS. 2A and 2B, the base plate 124 has elevated sections 120A, 120B that are displaced from the outer side sections 153A and 153B of the base plate but remain integral therewith.

An overview of apparatuses and systems further associated with this disclosure is illustrated in FIG. 1, FIG. 2A, and FIG. 2B. For example, the cover 122 of an air bag module typically includes an outer surface proximate to a driver and an inner surface that is distal to the driver. The inner surface of an air bag cover defines a seam (not shown) in a central portion thereof through which the driver air bag expands when inflated.

The base plate 124 includes one or more outer side sections 153A, 153B that extend from a center section 153C of the base plate to define the open central area 157 there between. One or more air bag module attachment tabs 160A, 160B extend outwardly from the side sections 153A, 153B of the base plate 124. These attachment tabs 160A, 160B extend from the base plate 124 and accommodate coupling an air bag module 120 and air bag cover 122 to the base plate 124. The air bag module is firmly secured to the base plate by appropriate fasteners that fit within the fastener openings 137A, 137B in the attachment tabs 160A, 160B. Therefore, the airbag module 120 and base plate 124 move in tandem when pressed upon by a user or vehicle driver. The pair are predominantly, if not exclusively, supported within the steering wheel assembly by the dampeners 30 and, therefore, axial movement of the dampener body move the ground contact 20 in and out of contact with the vehicle ground (e.g., the bolt 10). In other words, the dampener body is sufficiently elastic, either by the nature of the dampener material or by mechanical, accordion-type folds, to cause the dampener 30 to elongate in the presence of a user applying a selectable force onto the air bag module 120 or cover 122. The air bag module 120, the air bag module cover 122, and the base plate 124 travel within a range of motion 126A, 126B determined by the dampener elongating and/or compressing, depending on the biasing arrangement and the application or removal of a selectable force from the user. The base plate 124, therefore, moves axially in a direction parallel to a longitudinal axis 119 of the steering column. This axial movement back and forth along a line from a vehicle driver to an open central area 157 of the base plate 124 is useful herein to move a ground contact 20 in and out of electrical communication with a vehicle ground terminal (e.g., a common earth ground connection used for electronic circuits in the vehicle). FIGS. 2A and 2B illustrate that the base plate may include bumpers 140A-140D in selected locations to provide an interference fit between an airbag module and the base plate 124. The bumpers 140A-140D will be compressed when the air bag module is bolted to the base plate 24, and thus vibration and rattle noises will be minimized.

FIGS. 2A and 2B further illustrate the placement of horn grounding switches 180A, 180B, and 180C, although neither the number of switches nor the respective positions would be limiting of this disclosure. In general, an electronic control unit ECU 500 is a computerized control system to manage all outputs from a vehicle horn system. In one non-limiting embodiment, at least one electrical control circuit from the electronic control unit to the vehicle horn system has a power supply distributing a positive voltage and/or current to components of the ECU and/or the vehicle horn system. That control circuit, however, must be grounded via an earth ground connection, referred to herein as a vehicle ground, as most circuits in the vehicle would be. The embodiments of this disclosure present a new grounding circuit arrangement for use in various vehicle accessory systems, one of which is a vehicle horn system. Generally, and without limiting this disclosure, the horn grounding switches 180 of this disclosure are set up with a normally closed ground contact 20 in electrical communication with the vehicle ground during periods of normal vehicle operation with the horn in an "off" status. A user or driver, however, may apply a selectable force to the steering assembly 110, typically the air bag cover 122, and that selectable force is transmitted to the base plate 124 via the mechanical assemblies described in this disclosure. The base plate, in turn, is configured to move the ground contact 20 out of its electrical communication with the vehicle ground, and the ECU senses this change in the circuit as a user's command to place a vehicle horn in an "on" status until the ground contact 20 is placed back into electrical communication with the vehicle ground. This normally closed arrangement for the ground contact 20 and a vehicle ground component minimizes the gap space that prior embodiments utilized between actuated horn control contacts in the system.

In one non-limiting embodiment implementing the concepts shown in the attached figures, a steering assembly 110 includes a base plate 124 connected to a hub 114. At least one horn grounding switch 180A, 180B, 180C may be coupled to the base plate 124 and generates an output to toggle a vehicle horn between an off status and an on status via an ECU 500 in electronic communication with the horn grounding switch 180A, 180B, 180C via a circuit connector 170. FIG. 3 illustrates the individual components used to implement various embodiments of this disclosure. The components shown in FIG. 3 are expected to be attached in various non-limiting combinations to fulfill a need for the installation at hand. A respective ground contact 20 is positioned in the at least one horn grounding switch 180A, 180B, 180C, and the ground contact 20 generates an output transmitted from the horn grounding switch (e.g., via electrode 22) according to a selectable position relative to a vehicle electrical ground 133A, 133B, 133C. The ground contact 20 is movable from a normally closed position shown in FIGS. 6 and 7 with the ground contact 20 connected to the vehicle ground (conductive bolt 10), and that normally closed position corresponds to the off status of the vehicle horn. Moving the ground contact 20 to an open position that is disconnected from the vehicle ground corresponds to the on status of the vehicle horn. The on or off status is ultimately controlled by the ECU 500 receiving at least one output from at least one of the horn grounding switches 180A, 180B, 180C. As illustrated in FIGS. 2A and 2B, output signals from the respective horn grounding switches 180A, 180B, 180C are communicated to an electrical connector 170 via respective electrical conduits 165A, 165B, 165C. The electrical connector 170 is connected to the ECU for processing these signals and controlling the sound output from the horn system in the vehicle.

In one non-limiting embodiment of this disclosure, the horn grounding switches 180A, 180B, 180C are implemented as a part of a steering assembly 110 that is designed to accommodate an air bag module 120 coupled to the above noted base plate 124. The air bag module connects to the base plate 124 within the open central area 157 and connects to the attachment tabs 160A, 160B. In this embodiment, a bolt 10 serves as the above noted vehicle ground (i.e. a bolt 10 is in electrical communication with earth ground via a grounding circuit or a non-conductive component of the vehicle that serves as a common ground in the vehicle). The bolt 10, therefore, is in electrical communication with the vehicle electrical ground and coupled to the steering assembly 110. To ground a horn control circuit within the ECU and/or a vehicle horn system, the respective ground contact 20 is in an electrical connection with the grounded and electrically conductive bolt 10 in a normally closed position. In one non-limiting example, the ground contact 20 touches the bolt 10 or presses directly against a portion of the bolt 10. In the examples shown herein, the ground contact 20 is an annular ring that couples to a head 13 of the bolt 10 to make the ground connection, but other kinds of mechanical connections between a ground contact 20 and a vehicle ground are within the scope of this disclosure. The ground connection is sensed by the ECU as a voltage drop via conduits 165A, 165B, and/or 165C that may be connected to an electrode 22 extending from the ground contact 20 and transmitting voltage or current signals to the ECU 500 via the electrical connector 170.

Figure 7:
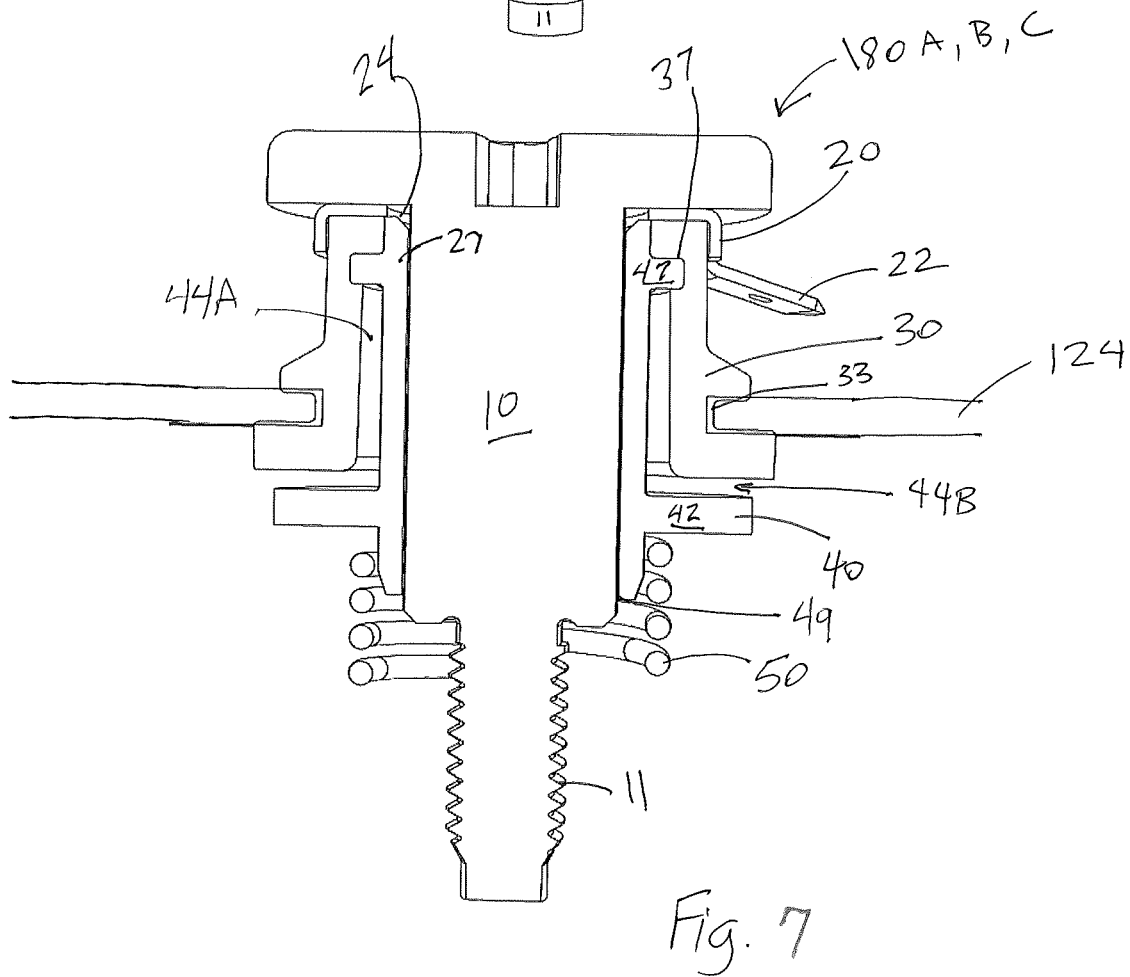
FIG. 7 is a cross section view of the horn grounding system of FIG. 6.

The embodiments that implement the horn grounding switches 180 in the steering assembly 110 typically include a dampener 30 coupled to the base plate 124 to absorb vibration from vehicle operation. The ground contact 20 may be coupled to or supported by this dampener 30, which is typically made of an elastomeric material or a polymer engineered for absorbing vibrational forces over long periods of time. To maintain the above described, normally closed position between the ground contact 20 and a vehicle ground, such as but not limited to, a head 13 on a bolt 10, the steering assembly encompasses a spring 50, such as a metal spring, to bias the ground contact 20 into a position forming an electrical connection with the bolt 10 connected to the vehicle electrical ground 133. As an intermediate connection device, a sleeve 40, such as a hard, plastic sleeve capable of withstanding the biasing force 51A, 51B, 51C from the spring 50, may be coupled to the dampener 30 to transmit the biasing force from the spring 50 to the ground contact 20, pressing the ground contact 20 into a normally closed switch position relative to the vehicle ground. The dampener 30 fits to the sleeve 40 with respective bottom and side clearances 44A, 44B that provide the dampener room to absorb vibration. As illustrated in FIG. 7, an elongated side wall 27 of the sleeve is configured to receive the bolt 10, and the dampener 30 is configured to receive the sleeve with the bolt therein. As noted above, a user or driver in the vehicle may apply selectable forces to the steering assembly 110 with the intent of operating a vehicle horn. By applying selectable forces to any of a plurality of regions along an air bag cover 122 and the corresponding air bag module 120, the selectable forces from the user are applied to the base plate to move the base plate in an axial direction away from the vehicle ground, which in one example is a bolt 10. When the selectable forces are greater than a biasing force 51 from the spring 50, the ground contact 20 moves away from the bolt 10 to an open position. The ECU senses this open position to active a horn on the vehicle.

FIGS. 2A and 2B illustrate that embodiments of this disclosure encompass steering assemblies that have multiple horn grounding switches 180A, 180B, 180C and those switches may be positioned at numerous places within the steering assembly along the base plate 124. So long as at least one of the horn grounding switches 180A, 180B, 180C is actuated by a selectable force transmitted to the base plate 124 and moves the base plate 124 in an axial direction away from the driver, at least one output from at least one ground contact 20 will alert the ECU to activate the horn on the vehicle. As shown in the Figures, the selectable forces from a user may be of such magnitudes and directions to actuate more than one of the horn grounding switches and provide multiple output signals to the ECU. The ECU can then use programmable algorithms to produce control signals for activating the horn system according to previously programmed software.

Figure 4A:
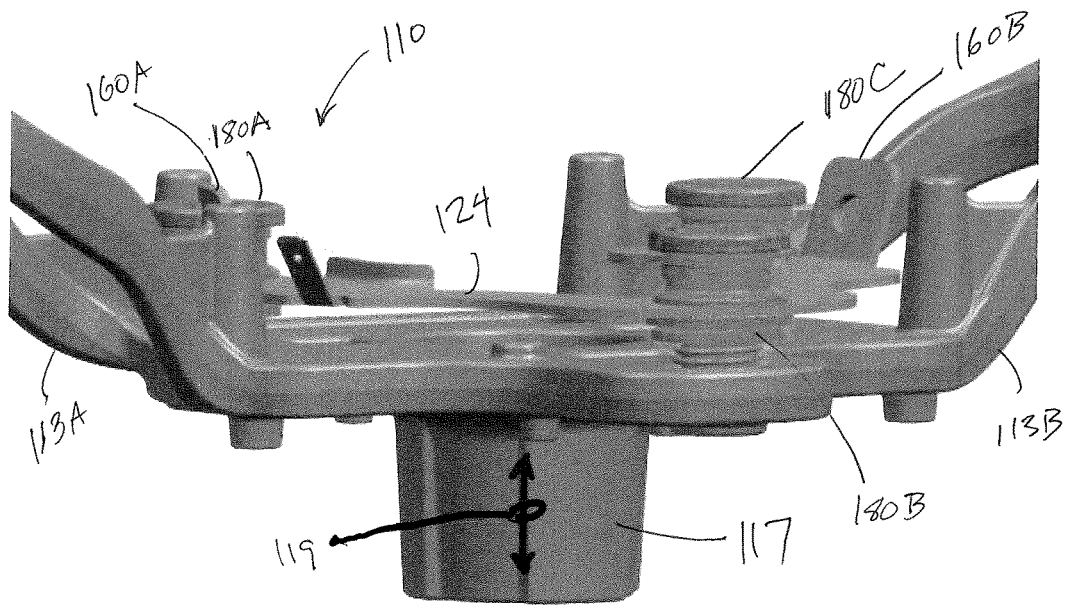
FIG. 4A is a front side perspective view of a base plate and associated horn grounding switches according to one implementation of this disclosure that is installed within a steering assembly that is supported by a steering column as described herein.
Figure 4B:
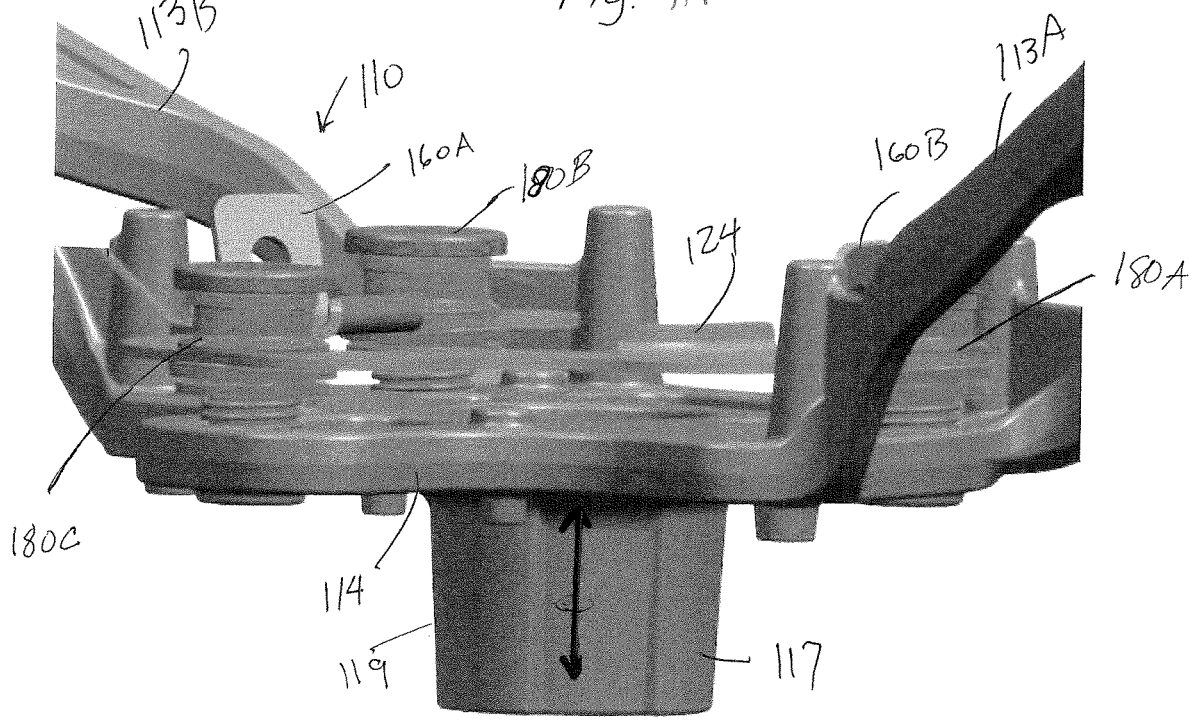
FIG. 4B is a rear side perspective view of a base plate and associated horn grounding switches according to one implementation of this disclosure installed within a steering assembly that is supported by a steering column as described herein.
Figure 5:
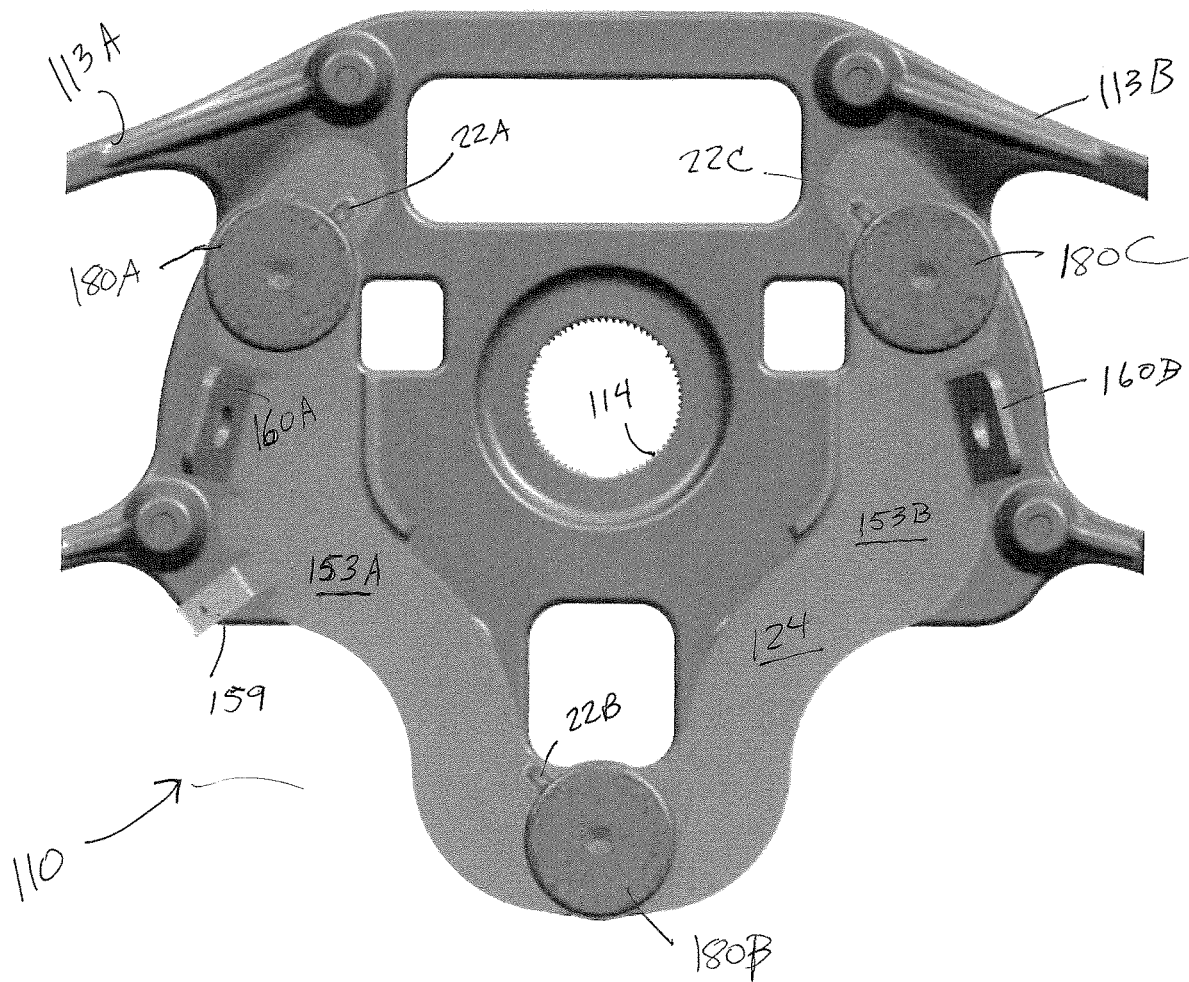
FIG. 5 is a top plan view of a base plate and associated horn grounding switches according to one implementation of this disclosure.

FIGS. 4A, 4B and 5 show different perspectives of a base plate 124 implementing example embodiments of the horn grounding system used in conjunction with a steering assembly 110 as described above. Axial movement as described above would typically be described as moving the base plate 124 and other associated components (e.g., the spring 50) along an axis 119 shown as being parallel to the longitudinal axis of the steering column 117 in a vehicle. Otherwise, like components described in regard to FIGS. 1-3 are referenced herein in side perspective views of FIGS. 4A and 4B and a top plan view of the grounding system illustrated in FIG. 5B.

Figure 6:
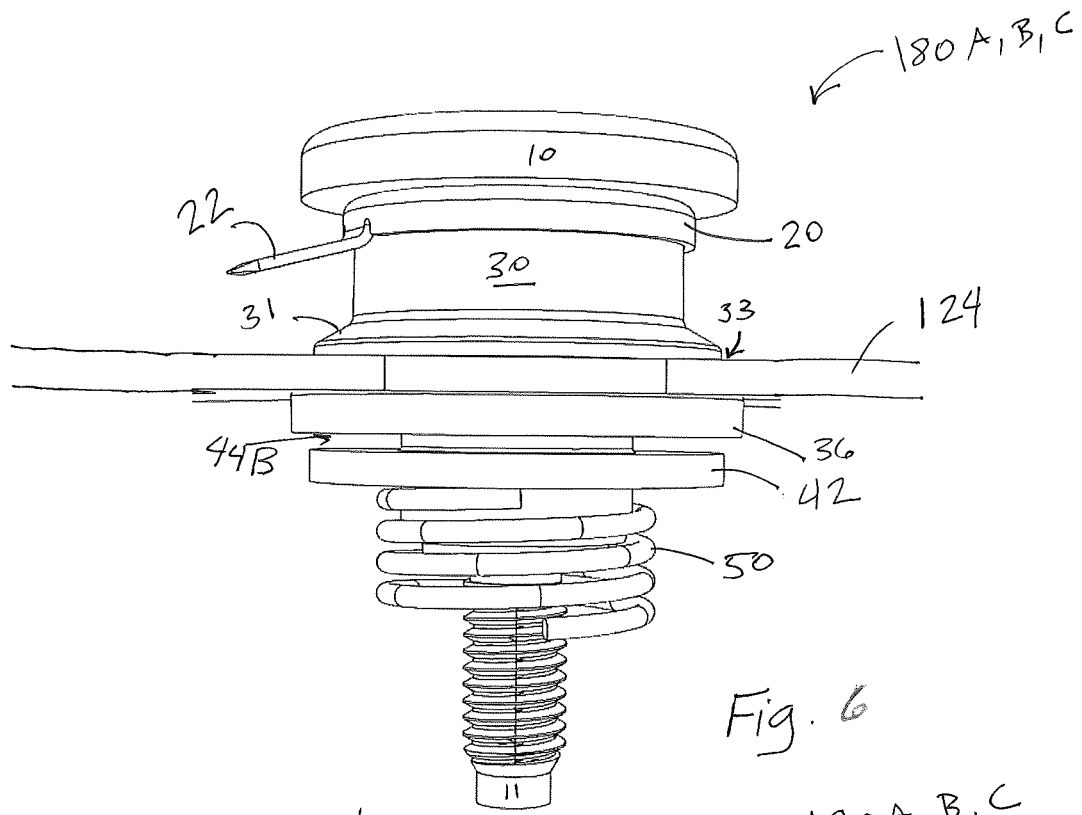
FIG. 6 is a side plan view of a horn grounding switch and associated components of a system for controlling a vehicle horn in a normally closed position as disclosed herein.

One goal of the embodiments described herein is to allow for a system that can communicate with the ECU to toggle a vehicle horn between an off status and an on status. An output from at least one horn grounding switch 180A, 180B, 180C may be communicated to the ECU via conduits 165A, 165B, 165C to provide data to the ECU representative of a selectable force from a user intending to active the vehicle horn. The horn grounding switches include respective ground contacts 20A, 20B, 20C that generate the output according to a selectable position relative to a vehicle electrical ground, wherein the ground contact is movable from a normally closed position connected to the vehicle ground that corresponds to the off status of the vehicle horn and an open position disconnected from the vehicle ground that corresponds to the on status of the vehicle horn. In one embodiment that is not limiting of the disclosure, the vehicle ground is embodied in a bolt 10 having a head 13 that is configured to engage the ground contact 20, which may have ring shape to maximize the ground connection to the bolt head 13. When the bolt head 13 is connected to an earth ground component of the vehicle, and the ground contact 20 is coupled to the bolt head 13 in a normally closed position, the output from the horn grounding switch 180A, 180B, 180C shows a voltage drop to ground that sensed at the ECU 500. So long as the voltage drop to ground is present, the vehicle is operated with the horn in an off status because the above noted spring 50 continually biases the ground contact to be in electrical communication with the vehicle ground. Upon a user's application of a selectable force to the air bag module 120 and the base plate 124, the base plate 124 moves in an axial direction 119 away from the user and the ground contact 20, breaking the ground contact connection to ground. This indicates that at least one of the ground contacts 20A, 20B, 20C has been disconnected from the vehicle electrical ground, and the ECU should toggle the vehicle horn to the on status. When a respective output from any one or more of the horn grounding switches 180A, 180B, 180C indicates a non-zero voltage sensed at the ECU, then a respective ground contact has been disconnected from the vehicle electrical ground to toggle the vehicle horn to the on status. In the example embodiments of this disclosure, FIGS. 6 and 7 illustrate the normally closed position for any one of the horn grounding switches 180A, 180B, 180C.

A system for operating a vehicle horn according to these embodiments includes a base plate 124 connected to an airbag module 120 in a steering assembly 110 supporting a horn grounding switch 180A, 180B, 180C. A respective bolt 10 may be directly connected to the vehicle electrical ground and secure each of the horn grounding switches to the steering assembly 110, wherein the ground contact 20 is positioned to be in an electrical connection with the bolt 10 in the normally closed position. The normally closed position is maintained during normal vehicle operation such that a connection between the bolt 10 (i.e., the bolt head 13) and the ground contact 20 is a normally closed position having zero gap between the ground contact 20 and the bolt 10 or other vehicle ground. A spring 50 supported by the steering assembly 110 is aligned with at least a portion of the ground contact 20, and the spring imparts a spring force biasing the ground contact 20 toward the bolt 10 in at least one embodiment where the bolt 10 is a grounding connection.

In other embodiments, a system for controlling a vehicle horn according to this disclosure utilizes a base plate connected to an airbag module 120 in a steering assembly 110 supporting the horn grounding switches 180A, 180B, 180C. The base plate 124 is in a position to receive a selectable force transmitted to the base plate 124 that moves the ground contact 20 away from the bolt 10 and the vehicle electrical ground. Switches described herein may be mechanically implemented by positioning a dampener 30 within the steering assembly 110 and supported within the steering assembly by the base plate 124. The base plate 124 is connected to the above described air bag module 120 and ultimately connected to the overall steering assembly 110 as discussed above. A sleeve 40 engages the dampener 30 at a proximate end of the sleeve facing the user of the vehicle and further engages the above noted biasing spring 50 supported by the steering assembly 110. In operation, the spring 50 exerts a spring force on the sleeve 40; the dampener 30 transmits the spring force toward the ground contact 20 and biases the ground contact to be in an electrical connection with the bolt 10 connected to the vehicle electrical ground.

In some embodiments, the base plate 124 is positioned in the steering assembly 110 with an axial range of motion determined according to its attachment to the air bag module 120 via attachment tabs 160A, 160B. Upon receiving a selectable force from a user, imparted through the air bag module 120 and oppositely to the spring force biasing the ground contact 20, the base plate 124 moves in the direction of the selectable force and places the ground contact 20 in an open position away from the bolt 10 (i.e., out of connection with a vehicle ground). The open position would typically be held for a temporary period during which the vehicle horn is in an "on" status, as determined by the ECU 500.

Figure 9:
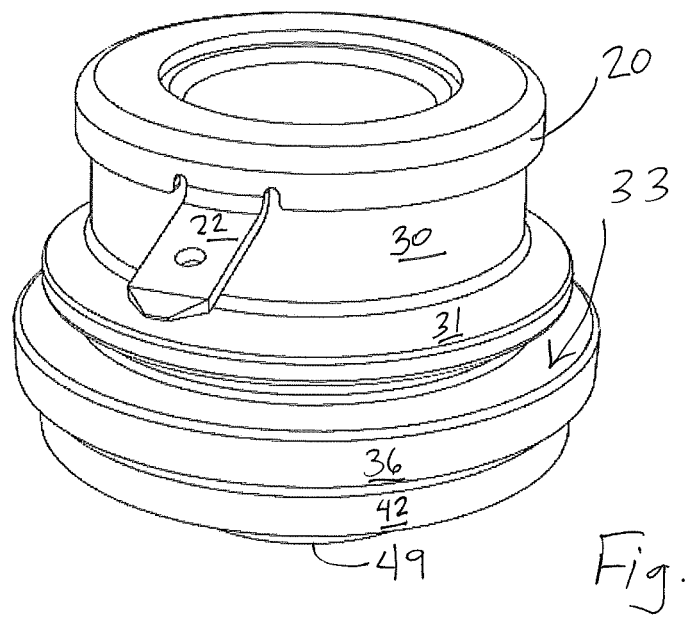
FIG. 9 is a front perspective view of a horn grounding switch assembly having a ground contact positioned on a sleeve and dampener combination.
Figure 10:
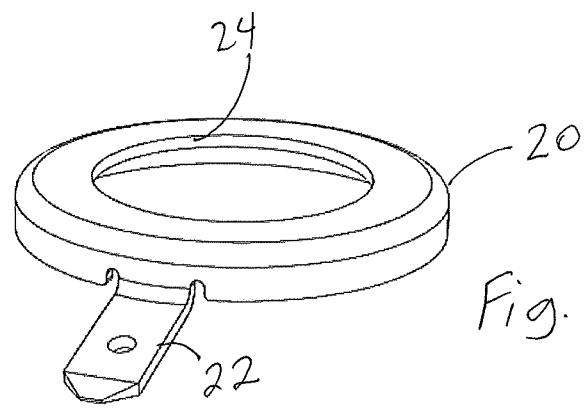
FIG. 10 is a top perspective view of a ground contact for a horn grounding switch according to one example embodiment described herein.

In certain non-limiting embodiments shown in the figures, a ground contact 20 of FIG. 10 is an annular shaped, electrically conductive contact defining a round circumferential opening 24 and an electrode 22 to connect to various conduits 165A, 165B, 165C. The opening 24 has an inner surface that is configured to couple to a dampener 30 shown in FIG. 11, which in turn mates with a sleeve 40 configured to be in contact with a spring 50 along an outer rim 42 of the sleeve 40. The sleeve 40 shown in FIG. 12 includes a distal sleeve end 49 configured to abut the spring 50, and the sleeve 40 also includes an outer edge 47 configured to engage a groove 37 within the dampener 30 as illustrated in FIGS. 8 and 9.

Figure 8:
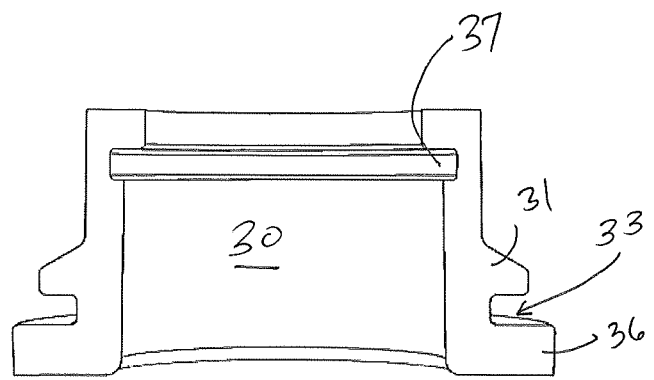
FIG. 8 is a cross section view of a dampener according to this disclosure.
Figure 11:
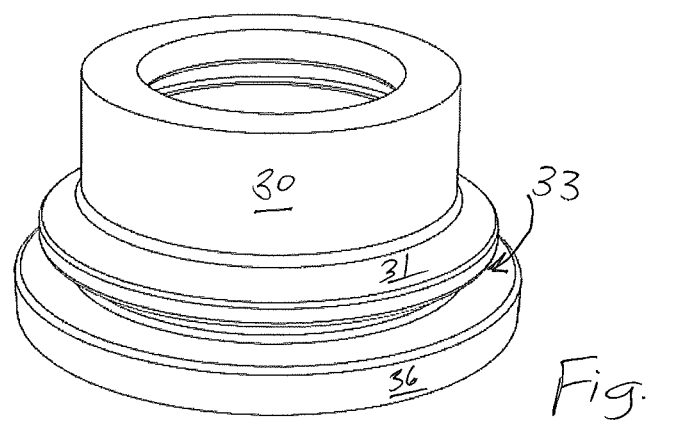
FIG. 11 is a top perspective view of a dampener for a horn grounding switch according to one example embodiment described herein.
Figure 12:
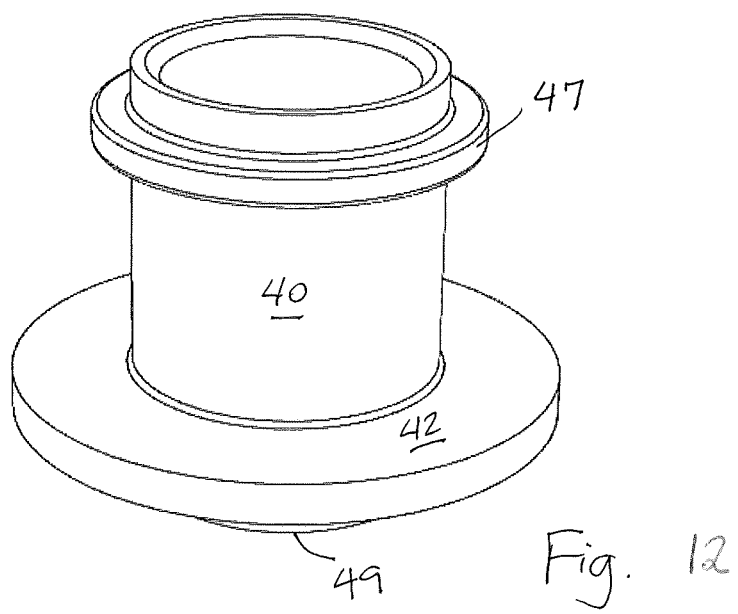
FIG. 12 is a top perspective view of a sleeve for a horn grounding switch according to one example embodiment described herein.

In regard to the transmission of a selectable force from a user to the base plate 124, via the air bag cover 122 and air bag module 120, FIGS. 8, 10, and 11 show more physical structure details for components in a system for controlling a vehicle horn, particularly in regarding to the grooves and fittings allowing the base plate 124 to fit within and alongside the dampener 30. To accomplish the engagement of the base plate 124 and the dampener 30, as illustrated in FIGS. 6 and 7, the dampener 30 defines an outer groove 33 between respective proximate and distal lips 31, 36. The base plate 124 includes a complementary shaped opening that matches the groove in the dampener and couples to the dampener accordingly. As the base plate moves up and down with respect to a ground contact 20, the dampener 30 extends and compresses accordingly and in conjunction with the biasing forces from the spring 50. When selectable forces on the base plate 124 are opposite to and in excess of the biasing forces of the spring 50, the base plate, in conjunction with the dampener, pull the ground contact 20 out of electrical communication with the vehicle ground, such as the bolt 10. Moving the ground contact 20 in and out of its normally closed position with respect to ground provides the ECU with simple but reliable information that the ECU can use to toggle the horn switch according to user application of selectable forces.

Figure 13:
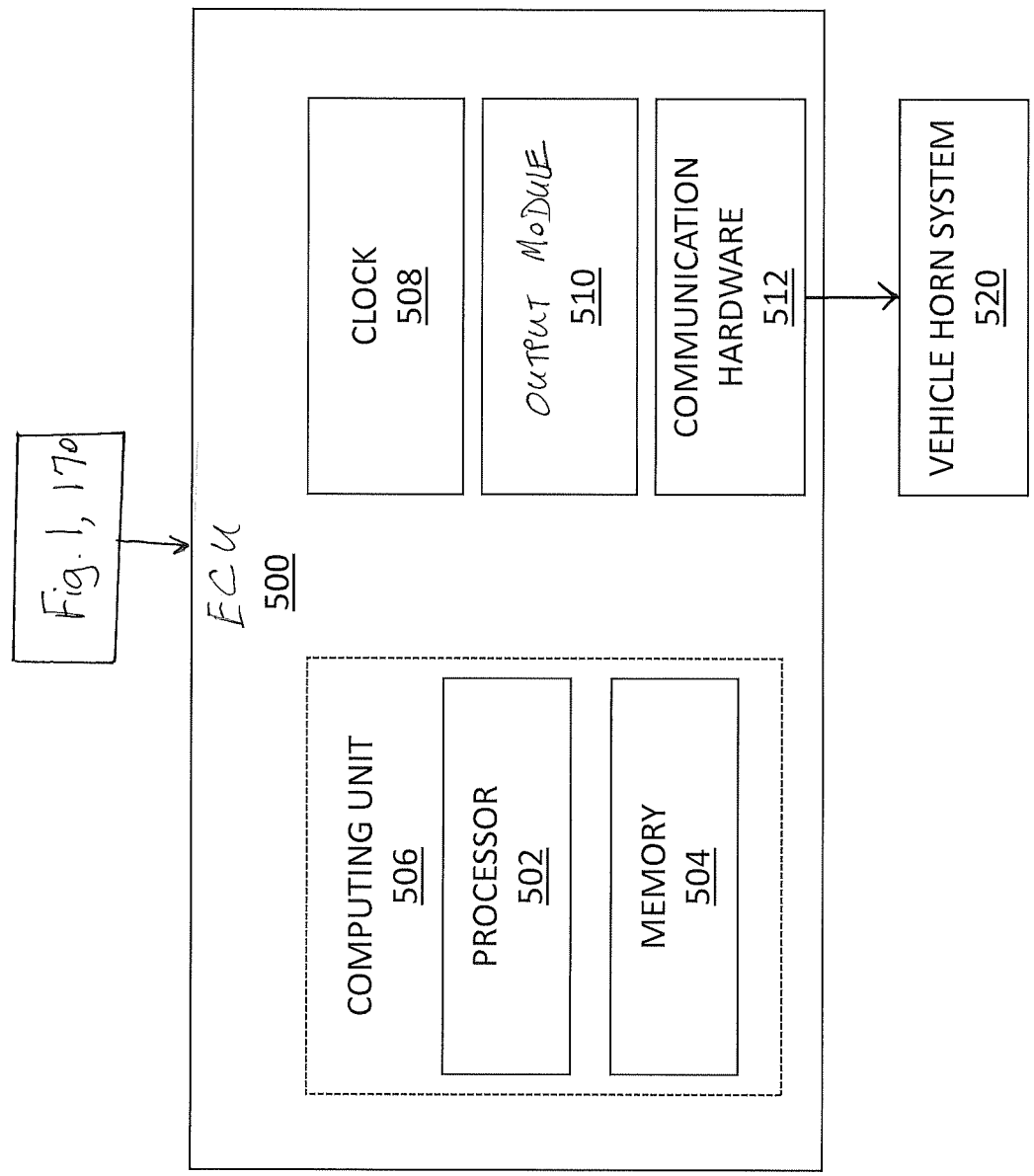
FIG. 13 is a schematic block diagram represented components associated with an electronic control unit according to this disclosure.

Implementations described above in relation to FIGS. 1 through 13 may be used to activate a horn of a horn system of a vehicle via an electronic control unit ("ECU") 500. In particular, the horn grounding switches 180 described below communicate with a computer processor, and depending on one or more characteristics and/or profiles of the electrical signals received from a horn grounding switch 180, the processor selects a control message from a plurality of control messages to communicate to a horn system 520 of the vehicle. The horn system receives the control message and actuates the horn based on the control message. In some non-limiting implementations of the ECU shown in FIG. 13, the control message may include an instruction to actuate the horn at a certain sound level, at a particular level or range of levels periodically, for a certain time period, in a particular direction from the vehicle (e.g., front, right side, left side), and/or using a particular sound. FIG. 13 illustrates a block diagram of a horn system 500 according to one implementation.

The sensor system 500 may include a computing unit 506, a system clock 508, an output module 510 and communication hardware 512. In its most basic form, the computing unit 506 may include a processor 502 and a system memory 504. The processor 502 may be a standard programmable processor that performs arithmetic and logic operations necessary for operation of the sensor system 500. The processor 502 may be configured to execute program code encoded in tangible, computer-readable media. For example, the processor 502 may execute program code stored in the system memory 504, which may be volatile or non-volatile memory. The system memory 504 is only one example of tangible, computer-readable media. In one aspect, the computing unit 506 can be considered an integrated device such as firmware. Other examples of tangible, computer-readable media include floppy disks, CD-ROMs, DVDs, hard drives, flash memory, or any other machine-readable storage media, wherein when the program code is loaded into and executed by a machine, such as the processor 502, the machine becomes an apparatus for practicing the disclosed subject matter.

Additionally, the processor 502 may be configured to associate the sensed changes in the at least one electrical property of signals received from a horn grounding circuit with a time from the system clock 508 and store the sensed changes and corresponding time to the system memory 504. Optionally, the processor 502 may be configured to analyze the stored data and associate measured changes to calculate a control message distributed by an output module 510 with various control messages for controlling horn functions. The communication hardware 512 may further be configured for communicating the selected control message(s) to the horn system 520.

The processor 502, which is in communication with memory 504, executes computer-readable instructions stored on the memory 504.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular implementations only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

The invention claimed is:

1. A system for operating a vehicle horn comprising:
   an electronic control unit (ECU) comprising a processor and memory configured to toggle the vehicle horn between an off status and an on status;
   a horn grounding switch in electronic communication with the ECU and directing an output to the ECU to toggle the vehicle horn;
   a ground contact that generates the output according to a selectable position relative to a vehicle electrical ground, wherein the ground contact is movable from a normally closed position connected to the vehicle electrical ground that corresponds to the off status of the vehicle horn and an open position disconnected from the vehicle electrical ground that corresponds to the on status of the vehicle horn;
   a base plate connected to an airbag module in a steering assembly supporting the horn grounding switch; and a bolt directly connected to the vehicle electrical ground and securing the horn grounding switch to the steering assembly, wherein the ground contact is connected to be in an electrical connection with the bolt in the normally closed position.

2. The system according to claim 1, wherein the output from the horn grounding switch comprises a non-zero voltage sensed at the ECU, indicating that the ground contact has been disconnected from the vehicle electrical ground to toggle the vehicle horn to the on status.

3. The system according to claim 1, further comprising base plate attachment tabs extending from the base plate for connecting the base plate to the airbag module in the steering assembly of a vehicle.

4. The system according to claim 3, wherein a connection between the bolt and the ground contact is a zero gap normally closed position.

5. The system according to claim 4, further comprising a spring supported by the steering assembly and aligned with at least a portion of the ground contact, wherein the spring imparts a spring force biasing the ground contact toward the bolt,
wherein the base plate is positioned in the steering assembly with a range of motion and upon receiving a selectable force, imparted through the airbag module and oppositely to the spring force, the base plate moves in a direction of the selectable force and places the ground contact in the open position away from the bolt for a temporary period during which the vehicle horn is in the on status.

6. The system according to claim 5, further comprising a dampener connected to the base plate and abutting the ground contact.

7. The system according to claim 5, further comprising a sleeve, the sleeve comprising a distal sleeve end abutting the spring and an outer edge engaging a groove within the dampener.

8. The system according to claim 1,
wherein, the base plate is in a position to receive a selectable force transmitted to the base plate that moves the ground contact away from the bolt and the vehicle electrical ground.

9. The system according to claim 8, wherein the horn grounding switch further comprises:
a dampener supported within the steering assembly by the base plate;
a sleeve engaging the dampener at a proximate end of the sleeve;
a spring supported by the steering assembly and engaging the sleeve,
wherein, the spring exerts a spring force on the sleeve, the dampener transmits the spring force and biases the ground contact to be in an electrical connection with the bolt connected to the vehicle electrical ground.

10. The system according to claim 9, wherein a selectable force on the base plate toggles the horn grounding switch from normally closed to open when the selectable force is greater than the spring force.

11. The system according to claim 9, wherein the dampener fits to the sleeve with a clearance that provides the dampener room to absorb vibration.

12. The system according to claim 11, the system further comprising a plurality of horn grounding switches having respective grounding contacts in electrical communication with the ECU and positioned on the base plate to receive respective selectable forces from respective regions of the base plate.

13. The system according to claim 12, wherein the plurality of horn grounding switches are positioned on the base plate such that the respective selected forces applied to respective regions of the airbag module apply a respective selected force to one or more than one of the horn grounding switches.

14. A steering assembly comprising:
a base plate connected to a hub;
at least one horn grounding switch coupled to the base plate and generating an output to toggle a vehicle horn between an off status and an on status;
a respective ground contact in each of the at least one horn grounding switches, the ground contact generating the output from a respective horn grounding switch according to a selectable position relative to a vehicle electrical ground, wherein the respective ground contact is movable from a normally closed position connected to the vehicle ground that corresponds to the off status of the vehicle horn and an open position disconnected from the vehicle electrical ground that corresponds to the on status of the vehicle horn;
an air bag module coupled to the base plate;
a bolt in electrical communication with the vehicle electrical ground and coupled to the steering assembly, wherein the respective ground contact is in an electrical connection with the bolt in the normally closed position;
a dampener coupled to the base plate and the ground contact;
a sleeve coupled to the dampener; and
a spring positioned between the sleeve and the steering assembly, wherein the spring biases the respective ground contact to be in a position forming an electrical connection with the bolt connected to the vehicle electrical ground; and
wherein selectable forces, when applied to the base plate and when greater than a biasing force from the spring, move the respective ground contact away from the bolt to the open position.

15. The steering assembly according to claim 14, wherein an edge of the base plate fits within a groove defined by the dampener.

16. The steering assembly according to claim 14, wherein the bolt is electrically connected to either a vehicle ground circuit connection or a non-conductive component in the steering assembly that is connected to earth ground.

17. The steering assembly according to claim 14, wherein the base plate defines an opening through the base plate, and the opening is configured to receive an airbag assembly having an airbag cover.

18. The steering assembly according to claim 17, further comprising base plate attachment tabs coupling the base plate to the airbag assembly, wherein the selectable forces are directed from the airbag cover to the base plate.

* * * * *